April 21, 1964

E. A. MADISON 3,129,844

CALIBRATORS

Filed Nov. 2, 1961

INVENTOR.
Emil A. Madison,
BY Parker & Carter
Attorneys.

United States Patent Office 3,129,844
Patented Apr. 21, 1964

3,129,844
CALIBRATORS
Emil A. Madison, Sac City, Iowa, assignor to Noble Manufacturing Company, Sac City, Iowa, a corporation of Iowa
Filed Nov. 2, 1961, Ser. No. 149,699
2 Claims. (Cl. 222—1)

This invention relates to means for and methods of applying any flowable material, chemicals, fertilizers, and the like, to farm land, soil or surface. One purpose is to provide means for setting the metering aperture or apertures of applicators for distributing such flowable materials, chemicals, fertilizers, etc., so that said flowable materials can be accurately measured.

Another purpose is to provide means effective for use in trial runs, to determine the proper setting of the discharge aperture, or apertures, through which materials are delivered for application to the soil, plants, or other surfaces.

Another purpose is to provide a method of determining the proper setting of applicators or the like.

Other purposes will appear from time to time in the course of the specification and claims.

In distributing solid chemicals, fertilizers, and the like, for application to the soil it is important to determine the proper setting of whatever metering aperture or apertures are employed to control the flow of the material or apertures are employed to control the flow of the material distributed. This problem arises in connection with weed killers, fertilizers, and the like, where the volume used, or the rate of application, may be important or critical. It is also important that the operator be freed from the necessity of making any computations. The present invention provides means and method for determining the applicator setting merely upon the basis of a trial run or two, and without the necessity of any special information or computation.

Assume that a farmer uses as an applicator a machine or an attachment which he drives across the surface of the land to be treated. Since various solid materials or chemicals have to be applied at various distributing rates, it is important to provide such machines or applicators with one or more delivery apertures which may be precisely adjusted to produce a desired rate of flow. It is further important, as to each material dispensed, that the user determine the proper setting for that particular material. It is the purpose of the present invention to enable the user to provide such a determination by a trial run or runs. He obtains a precise and proper setting of the discharge aperture or apertures for the material used, with no necessity of any computation.

Figure 1:
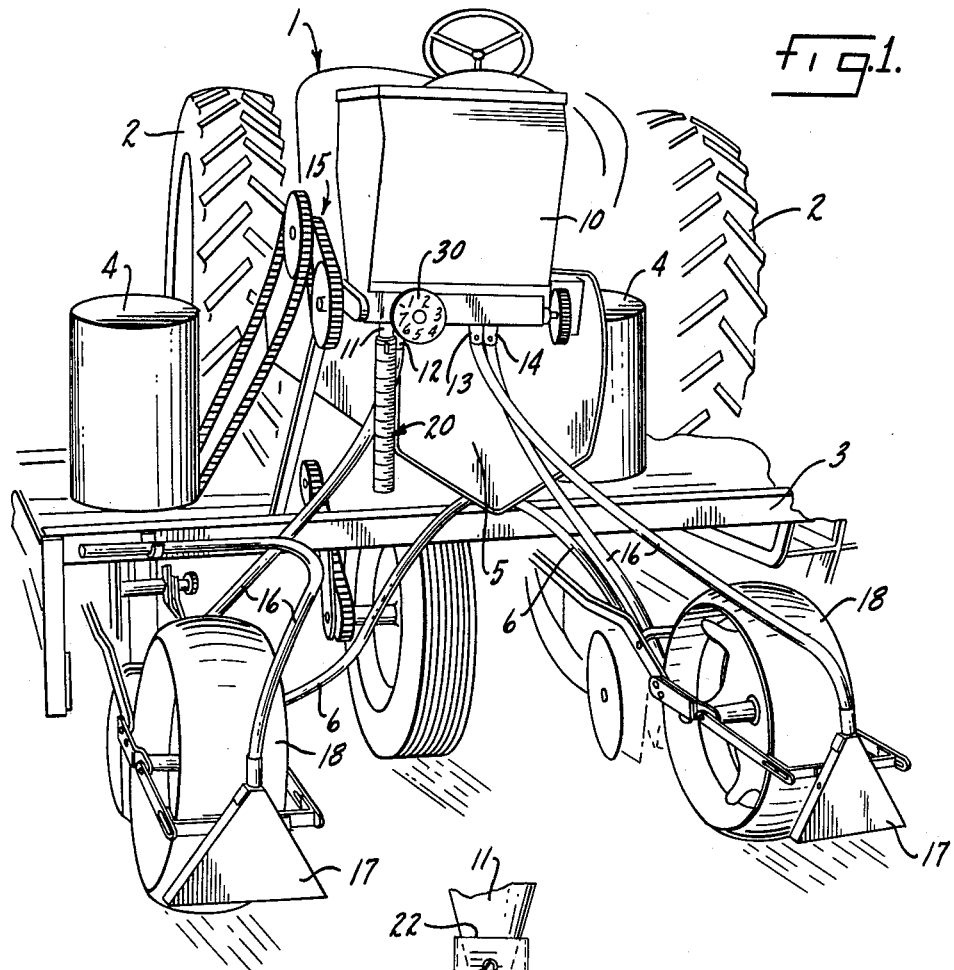
Figure 2:
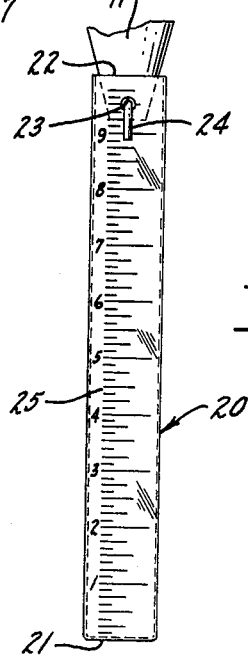

I illustrate the invention more or less diagrammatically in the accompanying drawings wherein:

FIGURE 1 illustrates an example of an applicator applied to a unit of farm machinery; and FIGURE 2 illustrates a metering or test device which may be employed in trial runs, with such structures as are shown in FIGURE 1, to determine the proper applicator setting.

Like parts are indicated by like symbols throughout the drawings and specification.

Referring first to FIGURE 1, the structure illustrated may be taken as a typical example of a type of equipment with which the invention may be employed. A tractor, generally indicated at 1, has the usual ground engaging supporting and driving wheels 2, and is shown as associated with a typical planter frame 3. Positioned on the frame 3 are seed containers 4 from which seed may be delivered to the ground in any desired manner, the details forming no part of the present invention. Mounted on the planter frame 3 is a container 5 which might be used for delivering a liquid fertilizer through suitable discharge ducts 6.

For dispensing solids I illustrate, on the structure shown in FIGURE 1, a hopper 10. Such a hopper may be employed to deliver through one or more outlets. In the particular example shown in FIGURE 1, four such outlets are illustrated as at 11, 12, 13 and 14. Where simultaneous delivery of more than one solid is wished, such multiple outlets may be arranged in a plurality of rows, for example, two, and any suitable rotors or agitators, not shown, may be employed for each row, to assist in the escape of solid particles through the various outlets. Such rotors or agitators may be driven, for example, from a planter driven gear or chain assembly, generally indicated at 15. It will be understood that the details of the structure for dispensing the solids do not of themselves form part of the present invention, and are given merely as an example. In FIGURE 1, flexible tubes or ducts 16 are indicated, some of which extend to delivery members 17, located forwardly of the pressure or compacting wheels 18. Others may terminate to the rear of the compacting wheels or extend to dispensing devices, not herein shown, which are located to the rear of the compacting wheels.

In dispensing solids, such as herbicides, insecticides, nematodicides, fungicides, and pesticides, or fertilizers, the solids may typically be supplied in bulk or in packages in granular form. Prevailingly, a desired rate or volume of distribution per acre is typical. However, the distribution rate may vary widely between insecticides and herbicides, or between different brands or different types of pesticides. The result is that to the user of any applicator apparatus it is important that he be able to set the delivery precisely.

The operator may know, as to a particular substance, that a certain volume should be deposited per acre. I find it advantageous to provide the operator with the information of what volume should be deposited upon a predetermined linear movement of the applicator. I find it convenient, and efficient, to determine the desired feed in terms of calibrating a tube or container in relation to the optimum delivery per unit of travel along the field. The material used may advantageously carry on its sack or container instruction as to the predetermined volume to be delivered during a travel of, say, 300 feet. The operator, according to my invention, is provided with a calibrated container, which may be applied, during a trial run or runs, and into which the material to be dispensed is received throughout the trial run. With reference, for example, to the structure of FIGURE 1, the flexible tube 16 may be removed, as shown at the lower left-hand of FIGURE 1.

In the place of the tube, a metered container, generally indicated at 20, may be applied. The container may be, for example, in the form of a tube having a closed bottom 21, an open top 22, and one or more securing apertures 23. A pin or other suitable securing member 24 may be passed through the aperture 23 and through appropriate opposed apertures in the outlet 11 from which the tube 16 has been removed. Any suitable calibration 25 may be applied to the circumferential wall of the container 20. The container 20 is preferably transparent or translucent so that the user can readily see the level to which the container has been filled, and can thus determine the volume which has been delivered into it during the trial run. The user makes a trial run at his desired operating speed. The operation of the drive chain 15 is such that the same volume of material is delivered from the outlet 11 into the container 20 as would normally be delivered along the passage 16 to the dispensing unit 17.

Any desired calibration may be employed. The containers can be calibrated either by the weight, bulk or volume of the material to be dispensed. If the operator were trying, for example, to distribute 6 cubic units of a substance per a run of 300 feet, his trial run would immediately indicate to him either that the outlet setting was too high or too low. Assume that instead of the desired 6 cubic units only 4 cubic units had been received, the operator would adjust the discharge shutter or other control means correspondingly to increase the flow. On the other hand, if the tube were filled at the end of the trial run the operator would then make a corresponding reduction of the discharge setting. In practice, a pair of trial runs is sufficient. The first trial run demonstrates what the initial setting would deliver. The second trial run would demonstrate the result of the correction. Possibly, an additional trial run, or runs, may, under some circumstances, be necessary, for obtaining a precise setting.

It will be understood that the details of the aperture adjustment are unimportant, but indicated at 30 in FIGURE 1 is a control knob or metering dial for operating whatever shutter or aperture varying structure is employed.

It will be realized that whereas I have described and shown a practical and operative method, and a device with which it may be employed, nevertheless, many changes may be made in method steps and in the size, shape, number and disposition of parts employed. I wish my description and drawings, therefore, to be taken as in a broad sense illustrative and diagrammatic rather than as limiting me to my precise showing herein.

The use and operation of the invention may be summarized as follows:

A problem in the use of distributing or dispensing devices is to determine proper setting of whatever metering aperture or apertures are employed to control the flow of material. Assuming that the operator uses a machine or attachment which is moved at a predetermined speed across the surface to be treated, the problem is to provide a proper metering setting to distribute the optimum volume of material. I find it advantageous to calibrate the test or trial container in terms of volume to be delivered per unit of travel along a field. In use a proper calibrated member, for example, a cylinder, is secured to receive the material discharged. The operator or user may determine a predetermined distance by pacing it out or by using a suitable measuring device. If the material used carries instructions on the sack for a predetermined volume of delivery per 100 feet, or 300 feet, or any predetermined distance of travel, the user, by merely inspecting the container 20 at the end of his test run, can tell precisely what result he is getting. He either increases or reduces the metering aperture and, in practice, a very small number of test runs is necessary. No computation is necessary. All that the user needs is the information on the package that a predetermined volume is to be delivered within a predetermined linear distance. On the basis of the first trial run, the necessary correction of setting is made. A second trial run may be advantageous for an even more accurate setting. It is, of course, important to provide means for the ready securing and removal, alternatively, to a single outlet, of a feeding duct such as 16 and of a calibrated container such as 20. A simple means is merely to provide apertures for inserting a removable pin or cotter by which, alternatively, the duct 16 or the container 20 may be secured in alignment with the discharge aperture.

As a matter of convenience I may supply as a kit for use with the applicator unit shown the calibrated tube and a linear measuring device. I find it advantageous in practice to provide a cord 301 feet long, of any suitable non-stretchable material. The extra foot provides for the attachment of the cord and leaves a free length of 300 feet. I provide an instruction book which gives the user the proper rate of use, in cubic units, as indicated on the applicator 20. Since my calibrator may be used with applicator units having one, two, three or more delivery tubes, four being shown in FIGURE 1, I can direct the user, by the instruction book or manual, as to the proper volume of flow into the calibrated tube 20 for any desired use of the device, both as to the number of tubes employed and as to the particular substance dispensed.

I claim:

1. The method of maintaining a predetermined distribution rate of chemicals or other materials upon a ground area, which includes moving a dispensing device in a trial run over said surface area through a predetermined linear distance, with an initial material delivery setting of the dispensing device, receiving the discharge of material from the dispensing device, during the trial run, in a container, comparing the quantity of material so received with the predetermined quantity for such linear distance, increasing or decreasing the delivery setting, as indicated by the relation of the material received to the desired quantity, repeating the trial run if and as necessary, removing the container when the desired setting is reached, and thereafter employing such a setting in the distribution of the material upon the surface area, while maintaining the rate of movement of the dispensing device over the ground at substantially the trial run rate.

2. The method of establishing a predetermined and pre-set distribution rate of chemicals or other materials upon a ground area which includes providing an adjustable dispensing device, initially interrupting the dispensing operation of such device by providing a removable receiving container, moving the dispensing device in a trial run over said ground area through a predetermined linear distance, terminating the trial run at the end of such distance, inspecting the received charge of material from the dispensing device and determining the volume delivered in relation to a predetermined calibration of the receiving device, increasing or decreasing the delivery setting, as indicated by the relation of the material received to the quantity demanded by the calibration, repeating the trial run if and as necessary, removing the container after the last trial run, substituting a dispensing member, and thereafter employing such a setting in the distribution of the material through said dispensing member and upon said ground area, while maintaining the rate of movement of the dispensing device over the ground area at substantially the linear speed of the trial run.

References Cited in the file of this patent

UNITED STATES PATENTS

| | | |
|---|---|---|
| 599,674 | Woodward | Feb. 22, 1898 |
| 1,564,470 | Crimmel | Dec. 8, 1925 |
| 1,829,771 | Walker | Nov. 3, 1931 |
| 2,368,735 | White | Feb. 6, 1945 |
| 2,645,986 | Rasmussen | July 21, 1953 |
| 2,733,848 | Bos Houwers | Feb. 7, 1956 |
| 2,753,099 | Jenner et al. | July 3, 1956 |
| 2,771,223 | Ryan | Nov. 20, 1956 |
| 2,852,166 | Gandrud | Sept. 16, 1958 |
| 2,925,835 | Mojonnier et al. | Feb. 23, 1960 |
| 2,959,328 | Palmer | Nov. 8, 1960 |
| 2,973,884 | Peoples et al. | Mar. 7, 1961 |
| 3,001,672 | Wahl | Sept. 26, 1961 |
| 3,013,695 | Caldwell | Dec. 19, 1961 |

OTHER REFERENCES

Farm Research, Vol. 16, #1, page 10, January 1950.

Scott's Spreader Surface Manual, No. 492, first page, section: "Rate Adjustment"; received June 6, 1956.

Machines for Power Farming, 1957, John Wiley & Sons, section: "Field Checking," pp. 367, 368.